(12) United States Patent
Steptoe et al.

(10) Patent No.: US 10,747,302 B2
(45) Date of Patent: Aug. 18, 2020

(54) ARTIFICIAL REALITY INTERACTION PLANE

(71) Applicant: Facebook Technologies, LLC, Menlo Park, CA (US)

(72) Inventors: William Arthur Hugh Steptoe, London (GB); Jonathan Ravasz, London (GB); Michael James LeBeau, Brooklyn, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 71 days.

(21) Appl. No.: 16/004,095

(22) Filed: Jun. 8, 2018

(65) Prior Publication Data

US 2019/0377406 A1    Dec. 12, 2019

(51) Int. Cl.
| | | |
|---|---|---|
| *G06F 3/01* | (2006.01) | |
| *G06F 3/0481* | (2013.01) | |
| *G06F 3/0484* | (2013.01) | |
| *G06T 3/40* | (2006.01) | |
| *A63F 3/02* | (2006.01) | |
| *A63F 13/537* | (2014.01) | |

(52) U.S. Cl.
CPC .............. *G06F 3/011* (2013.01); *A63F 3/02* (2013.01); *A63F 13/537* (2014.09); *G06F 3/04815* (2013.01); *G06F 3/04842* (2013.01); *G06T 3/40* (2013.01); *A63F 2300/8082* (2013.01)

(58) Field of Classification Search
CPC .... G02B 2027/0178; G02B 2027/0187; G02B 27/017; G02B 27/01; G06F 3/011; G06F 3/012; G06F 3/017; G06F 3/0482; G06F 3/04815; G06F 3/04845; G06F 3/0488; G06T 19/006; G06T 11/60; G09G 5/36; G09G 5/38; H04N 5/23216
See application file for complete search history.

(56) References Cited

U.S. PATENT DOCUMENTS

| | | | | |
|---|---|---|---|---|
| 2012/0249741 | A1* | 10/2012 | Maciocci | G06F 3/011 348/46 |
| 2014/0333666 | A1* | 11/2014 | Poulos | G06T 19/006 345/633 |
| 2014/0368535 | A1* | 12/2014 | Salter | G02B 27/017 345/619 |
| 2015/0091780 | A1* | 4/2015 | Lyren | G02B 27/017 345/8 |

(Continued)

*Primary Examiner* — Jin Cheng Wang
(74) *Attorney, Agent, or Firm* — Baker Botts L.L.P.

(57) ABSTRACT

In one embodiment, a method includes displaying a horizontal screen visible to a user through a display, determining a horizontal distance between a position of the user and the horizontal screen, determining a vertical distance between a controller associated with the user and the horizontal screen, creating an interaction screen, where the interaction screen and the horizontal screen intersect in a closest point, where the interaction screen is tilted toward the user from the horizontal screen by an angle, detecting a first event that a ray cast from a virtual representation of the controller hits a first point on the interaction screen, translating the first event to a second event that the ray cast hits a second point on the horizontal screen, and displaying a curved line from the controller to the second point on the horizontal screen that is visible to the user through the display.

20 Claims, 7 Drawing Sheets

(56) References Cited

U.S. PATENT DOCUMENTS

| | | | |
|---|---|---|---|
| 2016/0175702 A1* | 6/2016 | Black | A63F 13/28 |
| | | | 463/31 |
| 2016/0284136 A1* | 9/2016 | Johnston | G06T 19/006 |
| 2017/0287218 A1* | 10/2017 | Nuernberger | G06T 19/006 |
| 2017/0364153 A1* | 12/2017 | Kazansky | G06F 3/015 |
| 2018/0045963 A1* | 2/2018 | Hoover | G06F 3/011 |
| 2018/0158250 A1* | 6/2018 | Yamamoto | G06T 19/20 |
| 2018/0286126 A1* | 10/2018 | Schwarz | G06F 3/011 |
| 2018/0356630 A1* | 12/2018 | Masuya | G02B 27/0101 |

\* cited by examiner

ARTIFICIAL REALITY INTERACTION PLANE

TECHNICAL FIELD

This disclosure generally relates to artificial reality systems, and in particular, related to receiving human input in artificial reality systems.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device in an artificial reality system may create a transparent screen that may allow a user to precisely point to a location on a horizontal screen (e.g., a horizontal or substantially horizontal screen relative to the user) by providing the user better angular resolution. In an artificial reality system, a user may need to interact with a horizontal screen. For example, a user may play a chess game with another user who is connected through networks using an artificial reality system. The computing device may virtually generate a horizontal screen representing a skeuomorphic chess board. The chess board may comprise a plurality of pieces. The user may use a controller to point to a piece in order to move the piece to another location. The user may select a piece located at a first position by pointing the controller at the piece and clicking a button. The user may move the piece from the first position to a second position on the chess board by dragging the selected piece to the second position. The user may locate the piece at the second position by releasing the button. However, the user may find it difficult to point at an exact position on the chess board with the controller because a side farther from the user would appear smaller than a closer side of the chess board. Farther portions of the horizontal screen appear smaller not only because they are farther away, but also because the user's viewing angle of the farther portions is narrower.

To provide better angular resolution to the user in such scenarios, the computing device may generate a transparent interaction screen that is tilted towards the user so that an angular resolution of the interaction screen is better than an angular resolution of the horizontal screen. A point on the interaction screen may be mapped to a point on the horizontal screen. When a user points at a first point on the transparent interaction screen with the controller, the computing device may treat a corresponding second point on the horizontal screen as being pointed at. To guide the user to point at the desired point, the computing device may display a curved line (or any other suitable visual cue of what is being pointed at) from the user's virtual controller or hand to the pointed second point on the horizontal screen. The curved line may be visible to the user through a display to provide further visual cues as to what is being pointed at.

When a computing device associated with an artificial reality system receives a request to display a horizontal screen from a user, the computing device may virtually generate a horizontal screen in an artificial reality environment, where the horizontal screen is visible to the user through a display. In the example addressed above, the computing device may generate a skeuomorphic chess board with chess pieces located at their initial positions. The computing device may determine a horizontal distance between the user and the horizontal screen and a vertical distance between the controller and the horizontal screen. In order to determine the horizontal distance and the vertical distance, the computing device may use measurements from the sensors on the HMD or the controller. In particular embodiments, the computing device may measure the horizontal distance and the vertical distance within the artificial reality environment. The computing device may generate a transparent interaction screen that corresponds to the horizontal screen. The interaction screen may share the edge close to the user with the horizontal screen and may be tilted toward the user by an angle. The angle between the interaction screen and the horizontal screen may be determined based on the horizontal distance and the vertical distance. A size of the interaction screen may also be determined based on the horizontal distance and the vertical distance. When the computing device detects that an invisible ray cast from the controller hits a first point on the interaction screen, the computing device may translate the detected event into an event that a second point on the horizontal screen is hit by the ray cast. The computing device may present the user a visible curved line from the controller to the second point on the horizontal screen. When the user moves, the computing device may re-determine the horizontal distance and the vertical distance and may adjust the size and angle for the interaction screen.

In particular embodiments, a computing device may receive a command to display a horizontal screen from a user. The computing device may display a horizontal screen that is visible to the user through a display. The horizontal screen may have a point closest to the user. The horizontal screen may comprise one or more virtual objects. The horizontal screen may comprise one or more user interface components. The computing device may determine a first horizontal distance between a position of the user and the horizontal screen by measuring a distance between the position of the user and the closest point. The position of the user may be determined within an artificial reality environment. The position of the horizontal screen may be determined within the artificial reality environment. The computing device may determine a first vertical distance between a controller associated with the user and the horizontal screen. A height of the controller may be determined within the artificial reality environment. The user may use the controller to select a virtual object or a User Interface (UI) component on the horizontal virtual screen. The computing device may create a transparent interaction screen. The transparent interaction screen and the horizontal screen may intersect in the closest point. The transparent interaction screen may be tilted toward the user from the horizontal screen by an angle that may be determined based at least on the first horizontal distance or the first vertical distance. The computing device may detect a first event that a ray cast from a virtual representation of the controller hits a first point on the transparent interaction screen. The computing device may translate, in response to the detection, the first event to a second event that the ray cast hits a second point on the horizontal screen. The first point on the transparent interaction screen may be one-to-one mapped to the second point on the horizontal screen. The computing device may display a curved line from the controller to the second point on the horizontal screen. The curved line may be visible to the user through the display. The curved line may be a Bazier curve. The first point on the transparent interaction screen may be a control point of the Bazier curve. The computing device may determine a size of the transparent interaction screen based at least on the first horizontal distance and/or the first vertical distance. The computing device may detect a movement of the user. The computing device may determine a second horizontal distance between the user and the horizontal virtual screen. The computing device may determine a second vertical distance between the controller and the horizontal virtual screen. The computing device may adjust the angle between the transparent interaction screen and the horizontal screen based at least on the second horizontal distance or the second vertical distance. The computing device may increase the angle when the second horizontal distance is larger than the first horizontal distance. The computing device may decrease the angle when second horizontal distance is smaller than the first horizontal distance. The computing device may increase the angle when the second vertical distance is smaller than the first vertical distance. The computing device may decrease the angle when the second vertical distance is larger than the first vertical distance.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
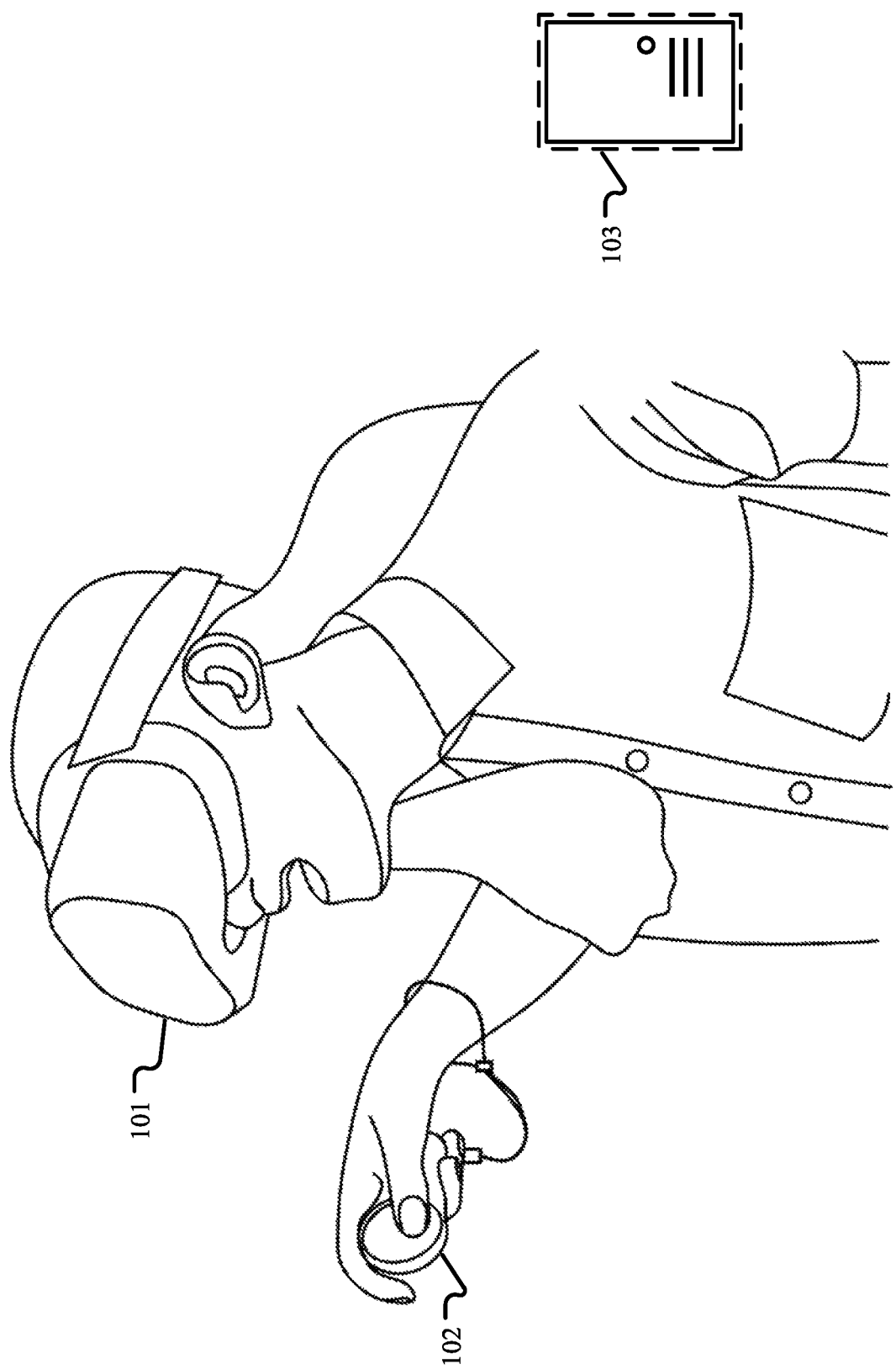
FIG. 1 illustrates an example artificial reality system.

FIG. 1 illustrates an example artificial reality system. Artificial reality is a form of reality that has been adjusted in some manner before presentation to a user 105, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The example artificial reality system illustrated in FIG. 1 may comprise a head-mounted display (HMD) 101, a controller 102, and a computing device 103. A user 105 may wear a head-mounted display (HMD) 101 that may provide visual artificial reality content to the user 105. The HMD 101 may include an audio device that may provide audio artificial reality content to the user 105. A controller 102 may comprise a trackpad and one or more buttons. The controller 102 may receive input from the user 105 and relay the input to the computing device 103. The controller 102 may also provide haptic feedback to the user 105. The computing device 103 may be connected to the HMD 101 and the controller 102. The computing device 103 may control the HMD 101 and the controller 102 to provide the artificial reality content to the user and receive input from the user 105. The computing device 103 may be a standalone host computer system, combined with the HMD 101, a mobile device, or any other hardware platform capable of providing artificial reality content to one or more users 105 and receive input from the users 105.

In particular embodiments, a computing device 103 in an artificial reality system may create a transparent screen that may allow a user 105 to precisely point to a location on a horizontal screen (e.g., a horizontal or substantially horizontal screen relative to the user) by providing the user 105 better angular resolution. In an artificial reality system, a user 105 may need to interact with a horizontal screen. For example, a user 105 may play a chess game with another user who is connected through networks using an artificial reality system. The computing device 103 may virtually generate a horizontal screen representing a skeuomorphic chess board. The chess board may comprise a plurality of pieces. The user 105 may use a controller 102 to point to a piece in order to move the piece to another location. The user 105 may select a piece located at a first position by pointing the controller at the piece and clicking a button. The user 105 may move the piece from the first position to a second position on the chess board by dragging the selected piece to the second position. The user 105 may locate the piece at the second position by releasing the button. However, the user may find it difficult to point at an exact position on the chess board with the controller 102 because a far side of the board from the user would appear smaller than a closer side of the chess board. Farther portions of the horizontal screen appear smaller not only because they are farther away, but also because the user's viewing angle of the farther portions is narrower. To provide better angular resolution to the user 105 in such scenarios, the computing device 103 may generate a transparent interaction screen that is tilted towards the user 105 so that an angular resolution of the interaction screen is better than an angular resolution of the horizontal screen. A point on the interaction screen may be mapped to a point on the horizontal screen. When a user 105 points at a first point on the transparent screen with the controller 102, the computing device may treat a corresponding second point on the horizontal screen as being pointed at. To guide the user 105 to point at the desired point, the computing device 103 may display a curved line (or any other suitable visual cue of what is being pointed at) from the user's controller or hand to the pointed second point on the horizontal screen. The curved line may be visible to the user 105 through a display 101 to provide further visual cues as to what is being pointed at.

When a computing device 103 associated with an artificial reality system receives a request to display a horizontal screen from a user 105, the computing device 103 may virtually generate a horizontal screen in an artificial reality environment, where the horizontal screen is visible to the user 105 through a display 101. In the example addressed above, the computing device 103 may generate a skeuomorphic chess board with chess pieces located at their initial positions. The computing device 103 may determine a horizontal distance between the user 105 and the horizontal screen and a vertical distance between the controller 102 and the horizontal screen. In particular embodiments, the computing device 103 may determine the vertical distance by a distance between HMD 101 and the horizontal screen. In order to determine the horizontal distance and the vertical distance, the computing device may use measurements from the sensors on the HMD 101 or the controller 102. In particular embodiments, the computing device 103 may measure the horizontal distance and the vertical distance within the artificial reality environment. The computing device 103 may generate a transparent interaction screen that corresponds to the horizontal screen. The interaction screen may share the edge close to the user 105 with the horizontal screen and may be tilted toward the user 105 by an angle. The angle between the interaction screen and the horizontal screen may be determined based on the horizontal distance and the vertical distance. A size of the interaction screen may also be determined based on the horizontal distance and the vertical distance. When the computing device 103 detects that an invisible ray cast from the controller 102 hits a first point on the interaction screen, the computing device 103 may translate the detected event into an event that a second point on the horizontal screen is hit by the ray cast. The computing device 103 may present the user 105 a visible curved line from the controller 102 to the second point on the horizontal screen. When the user 105 moves, the computing device 103 may re-determine the horizontal distance and the vertical distance and may adjust the size and angle for the interaction screen. Although this disclosure describes providing better angular resolution for a horizontal screen in an artificial reality application by utilizing a transparent interaction screen in a particular manner, this disclosure contemplates providing better angular resolution for a horizontal screen in an artificial reality application by utilizing a transparent interaction screen in any suitable manner.

In particular embodiments, a computing device 103 may receive a command to display a horizontal screen from a user 105. The computing device 103 may display a horizontal screen that is visible to the user 105 through a display 101. The horizontal screen may have a point closest to the user 105. The horizontal screen may comprise one or more virtual objects. The horizontal screen may comprise one or more user interface components. The computing device 103 may determine a first horizontal distance between a position of the user and the horizontal screen by measuring a distance between the position of the user and the closest point. The position of the user may be determined within an artificial reality environment. The position of the horizontal screen may be determined within the artificial reality environment. The computing device 103 may determine a first vertical distance between a controller 102 associated with the user 105 and the horizontal screen. A height of the controller may be determined within the artificial reality environment. The user 105 may use the controller 102 to select a virtual object or a User Interface (UI) component on the horizontal virtual screen. The computing device 103 may create a transparent interaction screen. The transparent interaction screen and the horizontal screen may intersect in the closest point. The transparent interaction screen may be tilted toward the user from the horizontal screen by an angle that may be determined based at least on the first horizontal distance or the first vertical distance. The computing device 103 may detect a first event that a ray cast from a virtual representation of the controller hits a first point on the transparent interaction screen. The computing device 103 may translate, in response to the detection, the first event to a second event that the ray cast hits a second point on the horizontal screen. The first point on the transparent interaction screen may be one-to-one mapped to the second point on the horizontal screen. The computing device 103 may display a curved line from the controller to the second point on the horizontal screen. The curved line may be visible to the user 105 through the display. The curved line may be a Bazier curve. The first point on the transparent interaction screen may be a control point of the Bazier curve. The computing device 103 may determine a size of the transparent interaction screen based at least on the first horizontal distance or the first vertical distance. The computing device 103 may detect a movement of the user. The computing device 103 may determine a second horizontal distance between the user and the horizontal virtual screen. The computing device 103 may determine a second vertical distance between the controller 102 and the horizontal virtual screen. The computing device 103 may adjust the angle between the transparent interaction screen and the horizontal screen based at least on the second horizontal distance or the second vertical distance. The computing device 103 may increase the angle when the second horizontal distance is larger than the first horizontal distance. The computing device 103 may decrease the angle when second horizontal distance is smaller than the first horizontal distance. The computing device 103 may increase the angle when the second vertical distance is smaller than the first vertical distance. The computing device 103 may decrease the angle when the second vertical distance is larger than the first vertical distance.

In particular embodiments, a computing device 103 associated with an artificial reality system may receive a command to display a horizontal screen from a user 105. The computing device 103 may display a horizontal screen that is visible to the user 105 through a display 101. As an example and not by way of limitation, a user 105 may want to play a chess game with one of her friend using an artificial reality system. The friend may be remotely located and connected through networks. The user 105 may connect with the friend and initiate a chess game application using an artificial reality system. The computing device 103 associated with the artificial reality system may receive a command to create a skeuomorphic chess board and display the chess board on the ground in an artificial reality environment. The artificial reality environment may be visible to the user 105 through a HMD 101, or any other type of display 101. In particular embodiments, the entire artificial reality environment may be virtually created by the computing device 103. In particular embodiments, the artificial reality environment may comprise real background captured by one or more cameras equipped on the HMD 101 and the virtually created chess board. As another example and not by way of limitation, a user 105 may want to play a poker game with a plurality of his friends through an artificial reality system. The friends may be remotely located and access the artificial reality system through networks. When the user initiated the game on the artificial reality system, the computing device 103 may receive a command to create and display a poker table. The computing device 103 may virtually create a skeuomorphic poker table and display the poker table that is visible to the user through a display 101. Although this disclosure describes receiving a command and display a horizontal screen that is visible to the user through a display in a particular manner, this disclosure contemplates receiving a command and display a horizontal screen that is visible to the user through a display in any suitable manner.

Figure 2:
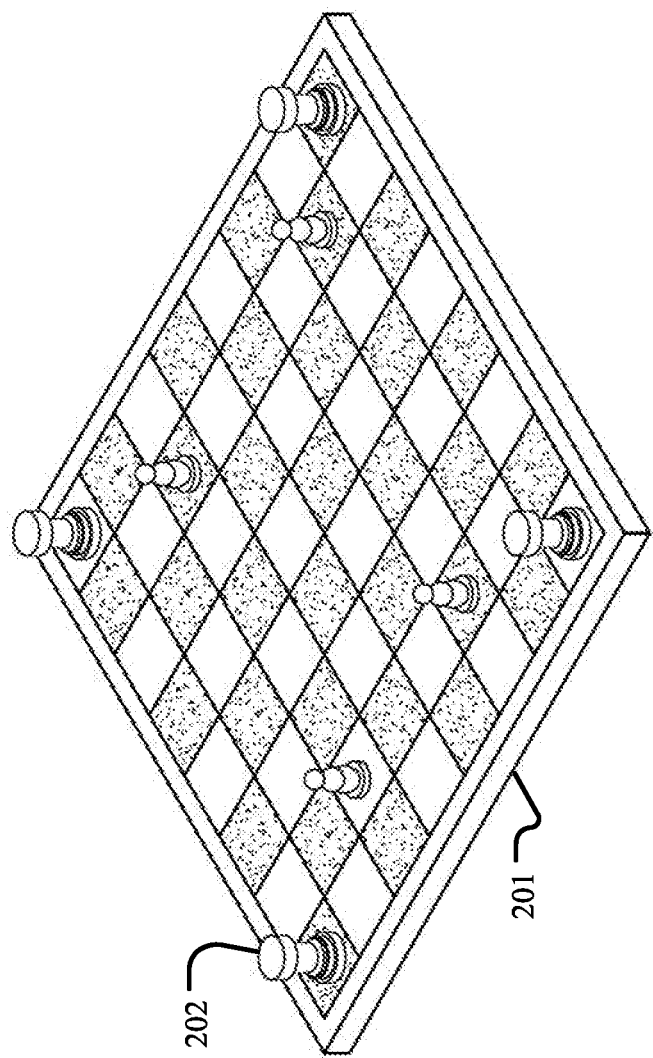
FIG. 2 illustrates an example horizontal screen with virtual objects.
Figure 2:
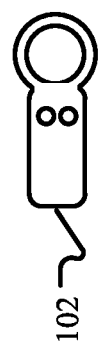

In particular embodiments, the horizontal screen may comprise one or more virtual objects. The user 105 may use the controller 102 to select a virtual object on the horizontal virtual screen. FIG. 2 illustrates an example horizontal screen with virtual objects. As an example and not by way of limitation, continuing with the prior example of the chess board, the chess board 201 may have a plurality of chess pieces 202. The user 105 may use a controller 102 to point to a piece 202 to move the piece 202 to another location. The user 105 may select a piece 202 located at a first position by pointing the controller 102 at the piece and clicking a button. The user 105 may move the piece 202 from the first position to a second position on the chess board 201 by dragging the selected piece 202 to the second position. The user 105 may locate the piece 202 at the second position by releasing the button. In particular embodiments, the horizontal screen may comprise one or more User Interface (UI) components. The user 105 may use the controller 102 to select a UI component on the horizontal virtual screen. As an example and not by way of limitation, continuing with the prior example of the poker table, the virtually created table may have a button to leave the game at a corner of the table. When the user 105 wants to leave the game, the user 105 may point the button using the controller 102 and click one of the buttons on the controller 102. In particular embodiments, the horizontal screen may have a point closest to the user 105. As an example and not by way of limitation, continuing with the prior example of the chess board, the skeuomorphic chess board may a square-shaped. The chess board may face the user on a side. A point on the side may be the closest point to the user 105. As another example and not by way of limitation, continuing with the prior example of the poker table, the poker table may not be a rectangle. The table may still have a point that is closest to the user 105. Although this disclosure describes particular characteristics of a horizontal screen in the artificial reality system, this disclosure contemplates any suitable characteristics of a horizontal screen in the artificial reality system.

In particular embodiments, the computing device 103 may create a transparent interaction screen. As the interaction screen is transparent, the user 105 may not be aware of existence of the interaction screen. In particular embodiments, the transparent interaction screen and the horizontal screen may intersect in the closest edge to the user 105 (in other words, the respective closest edges of the two screens may be aligned with each other). In particular embodiments, the transparent interaction screen and the horizontal screen may intersect in the closest point to the user 105. The transparent interaction screen may be tilted toward the user from the horizontal screen by an angle. The computing device 103 may determine the angle that may provide an optimal angular resolution. As an example and not by way of limitation, continuing with the prior example of the chess board, the chess board 201 may have an edge closer to the user 105 than the other edges. The computing device 103 may create a transparent interaction screen that intersects the chess board 201 in the closest edge and tilted toward the user 105 by an angle. As another example and not by way of limitation, continuing with the prior example of the poker table, the poker table may have a closest point to the user 105. The computing device 103 may create a transparent interaction screen that intersects the poker table in the closest point and is tilted toward the user 105 by an angle. Although this disclosure describes creating a transparent interaction screen in a particular manner, this disclosure contemplates creating a transparent interaction screen in any suitable manner.

Figure 3:
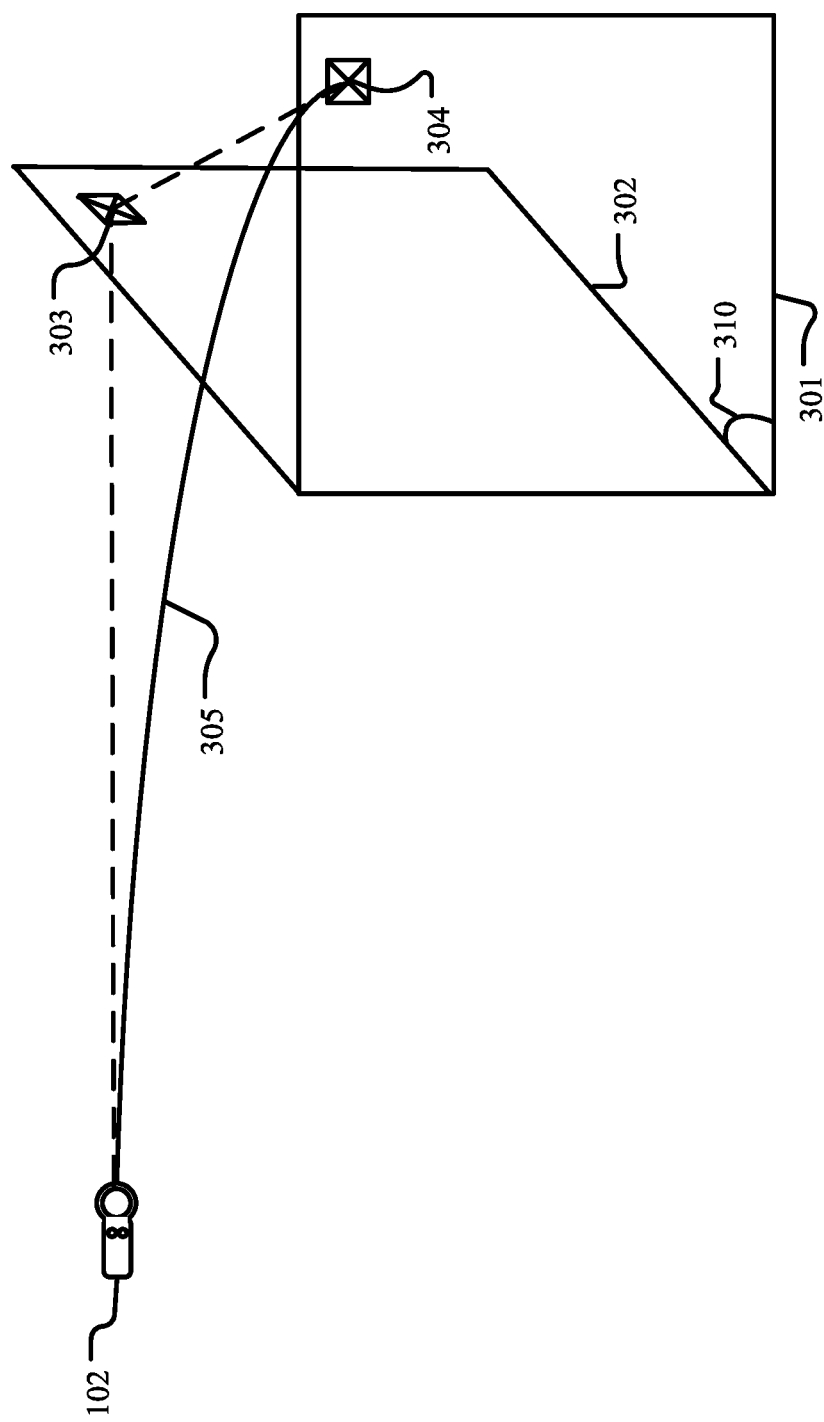
FIG. 3 illustrates an example interaction screen providing better angular resolution.

FIG. 3 illustrates an example interaction screen providing better angular resolution. The computing device 103 may create a horizontal screen 301 based on a command from the user 105. The computing device 103 may create a transparent interaction screen 302 that may intersect the horizontal screen 301 in an edge that may be closest to the user 105. The transparent interaction screen 302 may be tilted toward the user 105 by a particular angle 310. In particular embodiments, the computing device 103 may detect a first event that a ray cast from a virtual representation of the controller 102 hits a first point 303 on the transparent interaction screen 302. The ray cast may not be a real cast, but computed output by the computing device 103 in the artificial reality based on the virtual representation of the controller in the given artificial reality environment. The computing device 103 may translate, in response to the detection, the first event to a second event that the ray cast hits a second point 304 on the horizontal screen 301. The first point 303 on the transparent interaction screen 302 may be one-to-one mapped to the second point 304 on the horizontal screen 301. The computing device 103 may display a curved line 305 from the controller 102 to the second point 304 on the horizontal screen 301. The curved line 305 may be visible to the user 105 through the display. The curved line 305 may guide the user 105 to recognize which point on the horizontal screen is currently being pointed by the controller 102. The curved line may be a Bazier curve. The first point 303 on the transparent interaction screen 302 may be a control point of the Bazier curve.

As an example and not by way of limitation, continuing with the prior example of the chess board, the user 105 may want to move a piece 202 from a point to another point on the chess board 201. The user 105 may point the controller 102 toward the chess board 201. When a ray cast from the virtual representation of the controller 102 hits a first point 303 on the interaction screen 302, the computing device 103 may translate the event into another event that the ray cast from the virtual representation of the controller 102 hits a corresponding point on the chess board 201. The computing device 103 may display a curved line 305 from the controller 102 to the corresponding point on the chess board 201 so that the user 105 would know exactly which point on the chess board 201 is being pointed by the controller 102. Based on the displayed curved line 305, the user 105 may be able to move the controller 102 accordingly to point to the piece 202 the user 105 wants to move. Although this disclosure describes translating an event a ray cast from the controller hits a point on the interaction screen into another event that the ray cast hits a point on the horizontal screen in a particular manner, this disclosure contemplates translating an event a ray cast from the controller hits a point on the interaction screen into another event that the ray cast hits a point on the horizontal screen in any suitable manner.

Figure 4A:
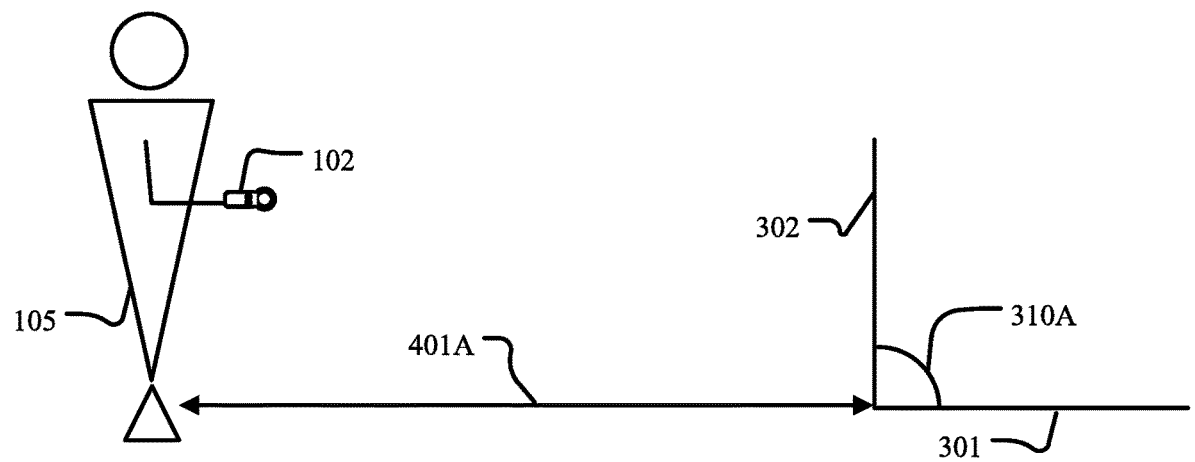
FIGS. 4A-4B illustrate example angles determined based on a horizontal distance between a controller associated with the user and the horizontal screen.
Figure 4B:
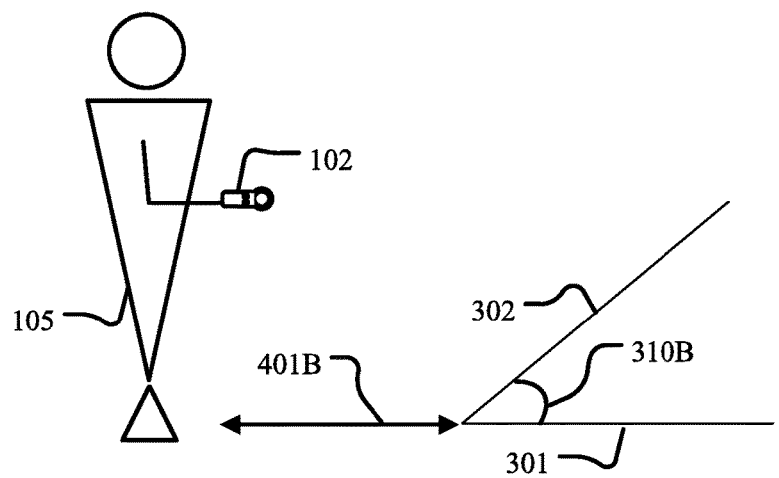

FIGS. 4A-4B illustrate example angles determined based on a horizontal distance between a position of the user and the horizontal screen. In particular embodiments, the computing device 103 may determine a first horizontal distance 401A between a position of the user and the horizontal screen 301 by measuring a distance between the position of the user and the closest point. The position of the user may be determined within an artificial reality environment. The position of the horizontal screen may be determined within the artificial reality environment. In particular embodiments, the computing device 103 may determine the first horizontal distance 401A by measuring a distance between the position of the controller 102 and the closest point of the horizontal screen 301. The computing device 103 may determine the angle 310A between the transparent interaction screen 302 and the horizontal screen 301 based on the first horizontal distance 401A when the computing device 103 creates the transparent interaction screen 302. In particular embodiments, the computing device 103 may also determine a size of the transparent interaction screen 302 based on the first horizontal distance 401A.

As an example and not by way of limitation, continuing with the prior example of the chess board, the computing device 103 may display the virtual chess board 201 on a table in the room. If the table is located far from the user 105, the chess board 201 may appear far from the user 105. The computing device 103 may measure a horizontal distance between the position of the user 105 and the closest side of the chess board 201. The computing device 103 may determine an angle by which the transparent interaction screen 302 is tilted from the chess board 201 toward the user 105 based on the measured horizontal distance. Because the horizontal distance is large in this example, the computing device 103 may determine a large value 310A for the angle 310. If the horizontal distance is small, the computing device may determine a small value for the angle 310. In particular embodiments, the computing device 103 may determine a size of the transparent interaction screen 302 based on the measured horizontal distance. If the horizontal distance 401A is within a threshold, the side of the transparent interaction screen 302 may be identical to a size of the horizontal screen 301. If the horizontal distance 401A is larger than the threshold, the computing device 103 may enlarge the size of the transparent interaction screen 302 that may be proportional to the horizontal distance 401A. Although this disclosure describes determining an angle between the transparent interaction screen and the horizontal screen based on a horizontal distance in a particular manner, this disclosure contemplates determining an angle between the transparent interaction screen and the horizontal screen based on a horizontal distance in any suitable manner.

In particular embodiments, the computing device 103 may detect a movement of the user 105. The computing device 103 may determine a second horizontal distance 401B between the user 105 and the horizontal screen 301. The computing device 103 may adjust the angle between the transparent interaction screen 302 and the horizontal screen 301 to a value 310B based on the second horizontal distance 401B. If the second horizontal distance 401B is smaller than the first horizontal distance 401A as illustrated in FIGS. 4A-4B, the computing device 103 may decrease the angle to 310B. If the second horizontal distance is larger than the first horizontal distance, the computing device 103 may increase the angle. As an example and not by way of limitation, the computing device 103 may detect a movement of the user 105. As illustrated in FIG. 4B, the second horizontal distance 401B is smaller than the first horizontal distance 401A, which is a horizontal distance before the user 105 moves. After determining the second horizontal distance 401B, the computing device may decrease the angle 310 to a smaller value 310B. Although this disclosure describes adjusting the angle between the transparent interaction screen and the horizontal screen based on a changed horizontal distance in a particular manner, this disclosure contemplates adjusting the angle between the transparent interaction screen and the horizontal screen based on a changed horizontal distance in any suitable manner.

Figure 5A:
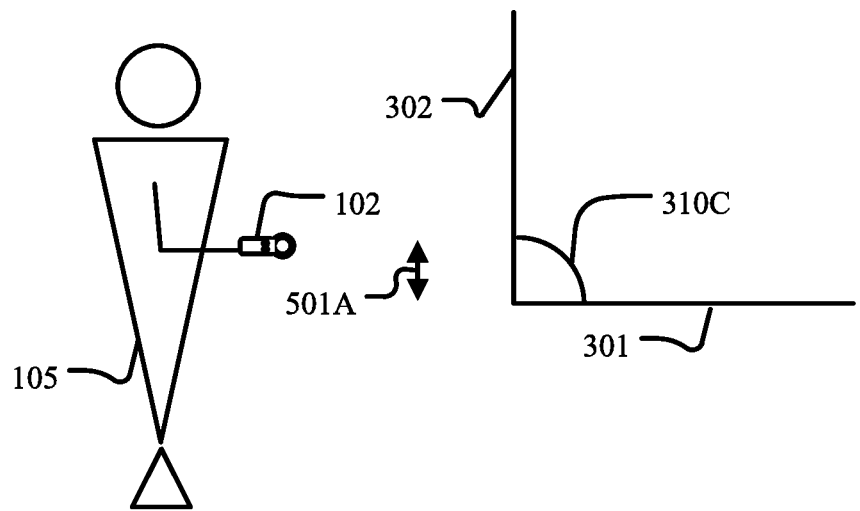
FIGS. 5A-5B illustrate example angles determined based on a vertical distance between a controller associated with the user and the horizontal screen.
Figure 5B:
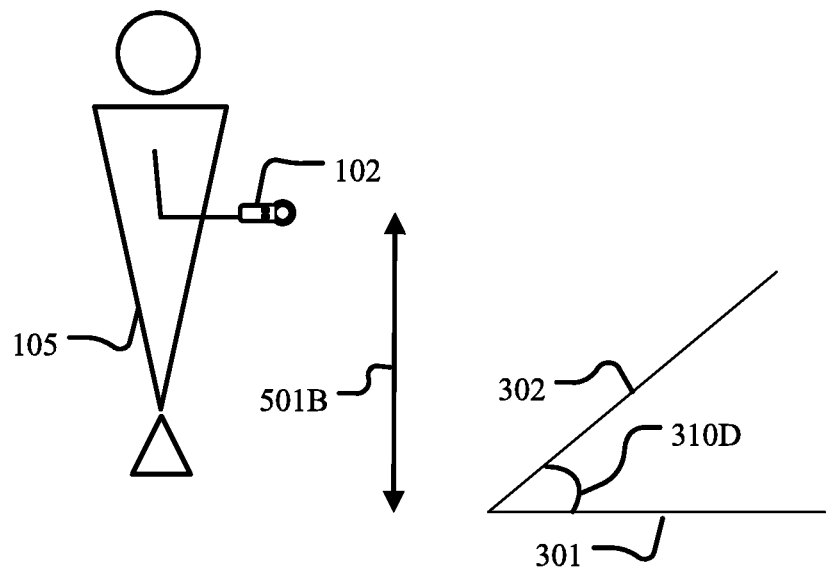

FIGS. 5A-5B illustrate example angles determined based on a vertical distance between a controller associated with the user and the horizontal screen. In particular embodiments, the computing device 103 may determine a first vertical distance 501A between a controller 102 associated with the user 105 and the horizontal screen 301. A height of the controller 102 may be determined within the artificial reality environment. The computing device 103 may determine the angle 310 between the transparent interaction screen 302 and the horizontal screen 301 to be a value 310C based on the first vertical distance 501A. In particular embodiments, the computing device 103 may determine a size of the transparent interaction screen 302 based the first vertical distance 501A. As an example and not by way of limitation, continuing with the prior example of the poker table, the computing device 103 may display a poker table that has long legs, as represented in FIG. 5A. In this case, the vertical distance 501A may be small. The computing device 103 may determine a first vertical distance 501A by measuring a vertical distance between the controller 102 and the poker table, which corresponds to a horizontal screen 301. When the vertical distance 501A is small, the angular resolution may become poor. Thus, the computing device 103 may set the angle 310 between the transparent interaction screen 302 and the horizontal screen 301 to a large value 310C. As another example and not by way of limitation, continuing with the prior example of the chess board, the computing device 103 may display the chess board 201 on the floor, as represented in FIG. 5B. The vertical distance 501B may be large in this case. The large vertical distance 501B may result in a better angular resolution. After determining the vertical distance 501B, the computing device 103 may set the angle 310 between the transparent interaction screen 302 and the horizontal screen 301 to a small value 310D. Although this disclosure describes determining an angle between the transparent interaction screen and the horizontal screen based on a vertical distance in a particular manner, this disclosure contemplates determining an angle between the transparent interaction screen and the horizontal screen based on a vertical distance in any suitable manner.

In particular embodiments, the computing device 103 may detect a movement of the user. As a result of the movement, the vertical distance may change. The computing device 103 may determine a second vertical distance between the controller 102 and the horizontal virtual screen 301. As an example and not by way of limitation, the vertical distance may become larger if the user 105 moves from a situation illustrated in FIG. 5A to a situation illustrated in FIG. 5B. On determining the second vertical distance 501B, the computing device 103 may decrease the angle 310 between the transparent interaction screen 302 and the horizontal screen 301 from a value 310C to a smaller value 310D. As another example and not by way of limitation, the vertical distance may become smaller if the user 105 moves from a situation illustrated in FIG. 5B to a situation illustrated in FIG. 5A. On determining the second vertical distance 501A, the computing device 103 may increase the angle 310 between the transparent interaction screen 302 and the horizontal screen 301 from a value 310D to a larger value 310C. In particular embodiments, the computing device 103 may adjust the size of the transparent interaction screen 302 based on a changed vertical distance. Although this disclosure describes adjusting the angle between the transparent interaction screen and the horizontal screen based on a changed vertical distance in a particular manner, this disclosure contemplates adjusting the angle between the transparent interaction screen and the horizontal screen based on a changed vertical distance in any suitable manner.

Figure 6:
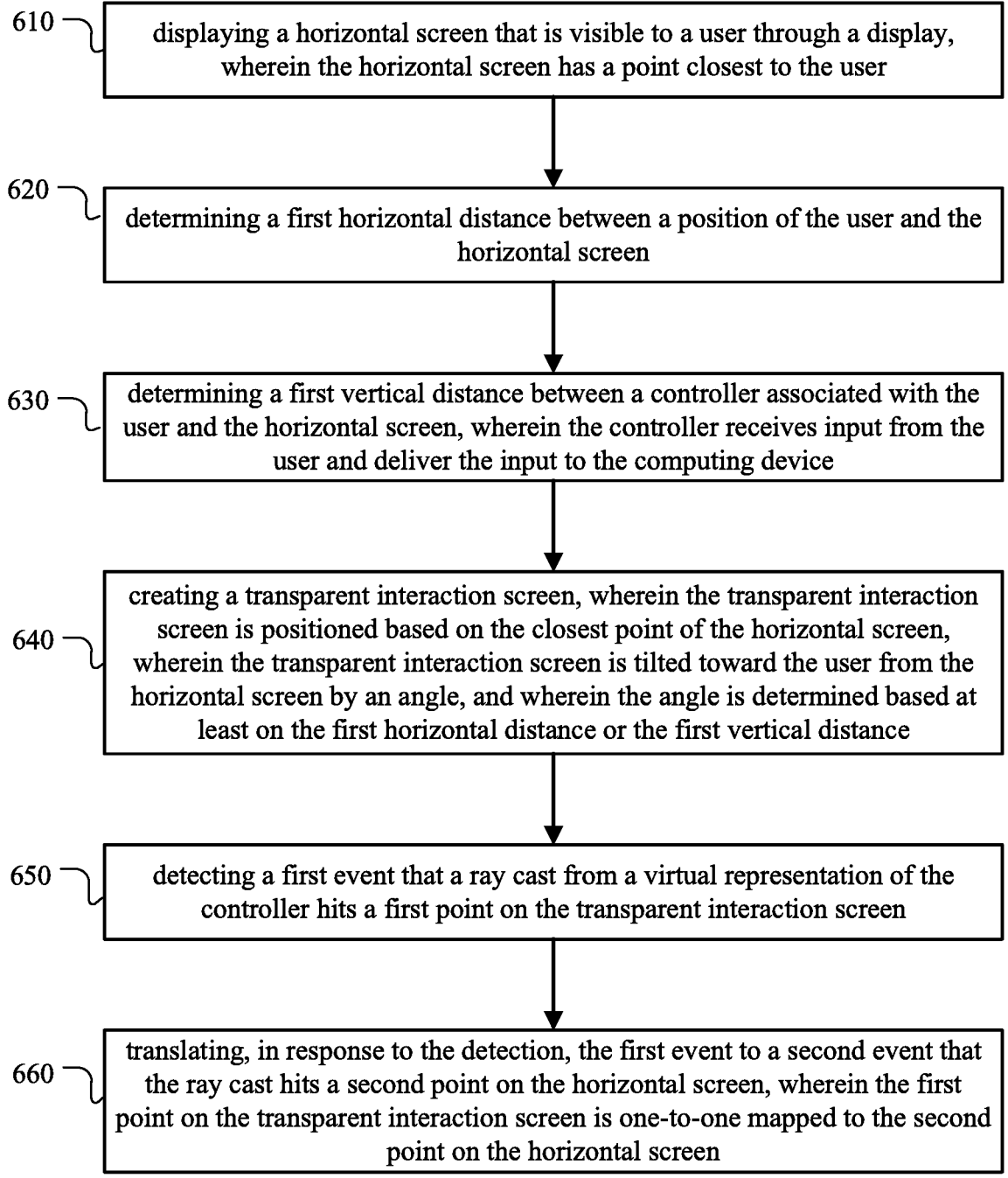
FIG. 6 illustrates an example method for utilizing a transparent interaction screen to provide better angular resolution for a horizontal screen in artificial reality systems.

FIG. 6 illustrates an example method 600 for utilizing a transparent interaction screen to provide better angular resolution for a horizontal screen in artificial reality systems. The method may begin at step 610, where the computing device 103 may display a horizontal screen that is visible to a user through a display, wherein the horizontal screen has a point closest to the user. At step 620, the computing device 103 may determine a first horizontal distance between a position of the user and the horizontal screen. At step 630, the computing device 103 may determine a first vertical distance between a controller associated with the user and the horizontal screen, wherein the controller receives input from the user and deliver the input to the computing device. At step 640, the computing device 103 may create a transparent interaction screen, wherein the transparent interaction screen is positioned based on the closest point of the horizontal screen, wherein the transparent interaction screen is tilted toward the user from the horizontal screen by an angle, and wherein the angle is determined based at least on the first horizontal distance or the first vertical distance. At step 650, the computing device 103 may detect a first event that a ray cast from a virtual representation of the controller hits a first point on the transparent interaction screen. At step 660, the computing device 103 may translate, in response to the detection, the first event to a second event that the ray cast hits a second point on the horizontal screen, wherein the first point on the transparent interaction screen is one-to-one mapped to the second point on the horizontal screen. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for utilizing a transparent interaction screen to provide better angular resolution for a horizontal screen in artificial reality systems including the particular steps of the method of FIG. 6, this disclosure contemplates any suitable method for utilizing a transparent interaction screen to provide better angular resolution for a horizontal screen in artificial reality systems including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
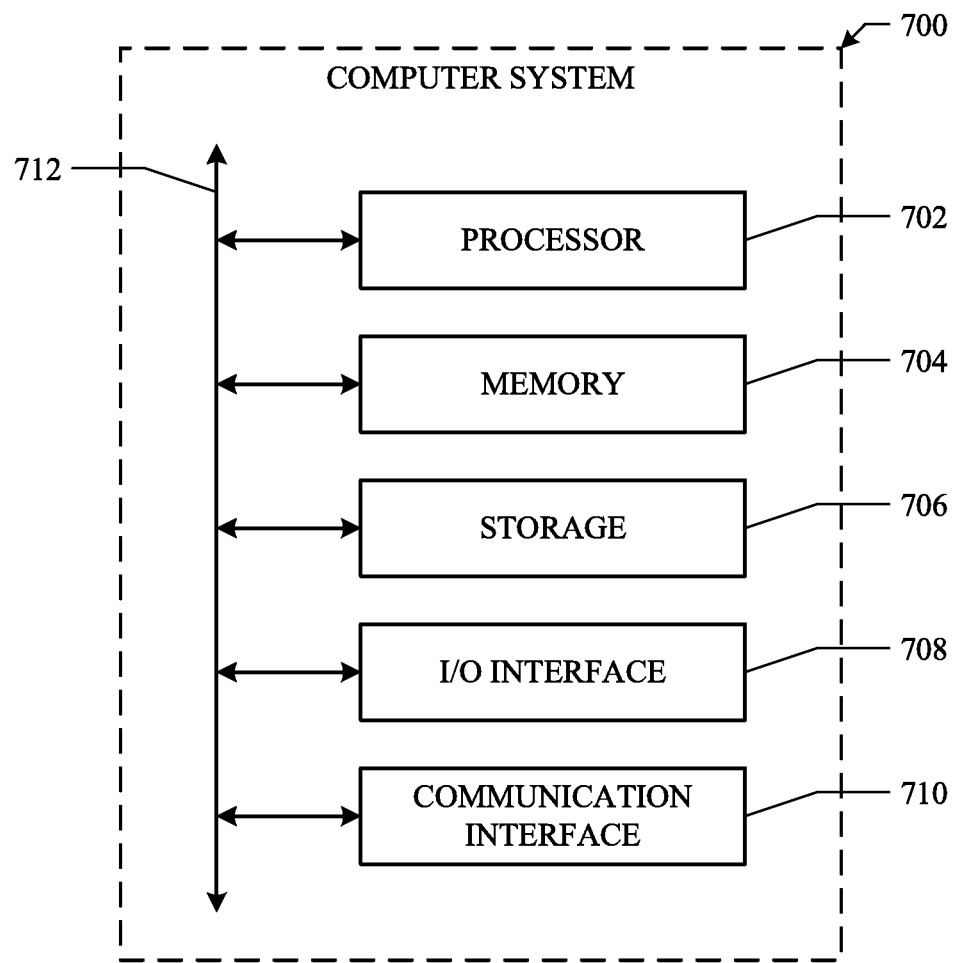
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
displaying a horizontal virtual screen in an artificial reality environment that is visible to a user through a display, wherein the horizontal virtual screen has a point closest to the user;
determining a first horizontal distance between a position of the user and the horizontal virtual screen;
determining a first vertical distance between a controller associated with the user and the horizontal virtual screen, wherein the controller receives input from the user and deliver the input to the computing device;
creating a transparent screen, wherein the transparent screen is positioned based on the closest point of the horizontal virtual screen, wherein the transparent screen is tilted toward the user from the horizontal virtual screen by an angle, and wherein the angle is determined based at least on the first horizontal distance or the first vertical distance;
detecting a first event that a ray cast from a virtual representation of the controller hits a first point on the transparent screen; and
translating, in response to the detection, the first event to a second event that the ray cast hits a second point on the horizontal virtual screen, wherein the first point on the transparent screen is one-to-one mapped to the second point on the horizontal virtual screen.

2. The method of claim 1, wherein displaying the horizontal virtual screen is in response to a command from the user.

3. The method of claim 1, wherein the horizontal virtual screen comprises one or more virtual objects.

4. The method of claim 1, wherein the horizontal virtual screen comprises one or more user interface components.

5. The method of claim 1, wherein the first horizontal distance between the position of the user and the horizontal virtual screen is the distance between the position of the user and the closest point.

6. The method of claim 5, wherein the position the user is determined within the artificial reality environment.

7. The method of claim 1, wherein a height of the controller is determined within the artificial reality environment.

8. The method of claim 1, wherein the controller is used by the user to select a virtual object or a UI component on the horizontal virtual screen.

9. The method of claim 1, further comprising displaying a curved line from the controller to the second point on the horizontal virtual screen, wherein the curved line is visible to the user through the display.

10. The method of claim 9, wherein the curved line is a Bezier curve, wherein the first point on the transparent screen is a control point of the Bezier curve.

11. The method of claim 1, further comprising determining a size of the transparent screen based at least on the first horizontal distance or the first vertical distance.

12. The method of claim 1, further comprising:
detecting a movement of the user;
determining a second horizontal distance between the user and the horizontal virtual screen;
determining a second vertical distance between the controller and the horizontal virtual screen;
adjusting the angle between the transparent screen and the horizontal virtual screen based at least on the second horizontal distance or the second vertical distance.

13. The method of claim 12, wherein the adjusting the angle comprises increasing the angle when the second horizontal distance is larger than the first horizontal distance.

14. The method of claim 12, wherein the adjusting the angle comprises decreasing the angle when second horizontal distance is smaller than the first horizontal distance.

15. The method of claim 12, wherein the adjusting the angle comprises increasing the angle when the second vertical distance is smaller than the first vertical distance.

16. The method of claim 12, wherein the adjusting the angle comprises decreasing the angle when the second vertical distance is larger than the first vertical distance.

17. One or more computer-readable non-transitory storage media embodying software that is operable when executed to:
display a horizontal virtual screen in an artificial reality environment that is visible to a user through a display, wherein the horizontal virtual screen has a point closest to the user;
determine a first horizontal distance between a position of the user and the horizontal virtual screen;
determine a first vertical distance between a controller associated with the user and the horizontal virtual screen, wherein the controller receives input from the user and deliver the input to the computing device;
create a transparent screen, wherein the transparent screen is positioned based on the closest point of the horizontal virtual screen, wherein the transparent screen is tilted toward the user from the horizontal virtual screen by an angle, and wherein the angle is determined based at least on the first horizontal distance or the first vertical distance;
detect a first event that a ray cast from a virtual representation of the controller hits a first point on the transparent screen; and
translate, in response to the detection, the first event to a second event that the ray cast hits a second point on the horizontal virtual screen, wherein the first point on the transparent screen is one-to-one mapped to the second point on the horizontal virtual screen.

18. The media of claim 17, wherein displaying the horizontal virtual screen is in response to a command from the user.

19. The media of claim 17, wherein the horizontal virtual screen comprises one or more virtual objects.

20. A system comprising:
one or more processors; and
one or more computer-readable non-transitory storage media coupled to one or more of the processors and comprising instructions operable when executed by one or more of the processors to cause the system to:
display a horizontal virtual screen in an artificial reality environment that is visible to a user through a display, wherein the horizontal virtual screen has a point closest to the user;
determine a first horizontal distance between a position of the user and the horizontal virtual screen;
determine a first vertical distance between a controller associated with the user and the horizontal virtual screen, wherein the controller receives input from the user and deliver the input to the computing device;
create a transparent screen, wherein the transparent screen is positioned based on the closest point of the horizontal virtual screen, wherein the transparent screen is tilted toward the user from the horizontal virtual screen by an angle, and wherein the angle is determined based at least on the first horizontal distance or the first vertical distance;
detect a first event that a ray cast from a virtual representation of the controller hits a first point on the transparent screen; and
translate, in response to the detection, the first event to a second event that the ray cast hits a second point on the horizontal virtual screen, wherein the first point on the transparent screen is one-to-one mapped to the second point on the horizontal virtual screen.

* * * * *